(12) United States Patent
Anderson et al.

(10) Patent No.: US 7,833,629 B2
(45) Date of Patent: Nov. 16, 2010

(54) TRANSPARENT SUBSTRATE COMPRISING AN ANTIREFLECTION COATING

(75) Inventors: Charles Anderson, Courbevoie (FR); Ulf Blieske, Monchengladbach (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/496,966

(22) Filed: Jul. 2, 2009

(65) Prior Publication Data

US 2010/0000591 A1    Jan. 7, 2010

Related U.S. Application Data

(62) Division of application No. 10/296,410, filed as application No. PCT/FR01/01735 on Jun. 6, 2001, now abandoned.

(30) Foreign Application Priority Data

Jun. 7, 2000    (FR) .................................. 00 07271

(51) Int. Cl.
    *B32B 17/06* (2006.01)
(52) U.S. Cl. .................... 428/432; 428/428; 428/689; 428/699; 428/701; 428/702
(58) Field of Classification Search .............. 428/428, 428/432, 689, 697, 699, 701, 702
    See application file for complete search history.

(56) References Cited

U.S. PATENT DOCUMENTS

| 4,807,204 A | 2/1989 | Mizutani et al. |
| 5,105,310 A | 4/1992 | Dickey |
| 5,377,045 A | 12/1994 | Wolfe et al. |

(Continued)

FOREIGN PATENT DOCUMENTS

EP    0 739 042    10/1996

(Continued)

OTHER PUBLICATIONS

R. Uirch, et al., "Potentiostatic testing of thin silicon nitride films", Chem. Eng. Comm., 1995, vol. 137, pp. 23-32.

(Continued)

*Primary Examiner*—Gwendolyn Blackwell
(74) *Attorney, Agent, or Firm*—Oblon, Spivak, McClelland, Maier & Neustadt, L.L.P.

(57) ABSTRACT

The subject of the invention is a transparent substrate (6) having at least one antireflection coating, made from a film (A) comprising multiple thin layers of alternately high and low refractive indexes.

Figure 1:
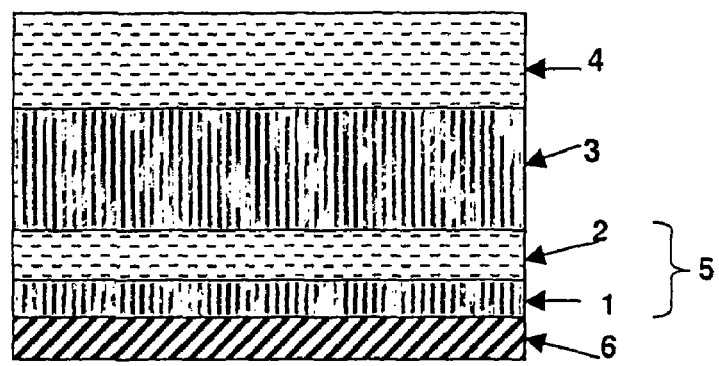

The multilayer film comprises, in succession:
- a high-index first layer (1), having a refractive index $n_1$ of between 1.8 and 2.3 and a geometrical thickness $e_1$ of between 5 and 50 nm;
- a low-index second layer (2), having a refractive index $n_2$ of between 1.30 and 1.70 and a geometrical thickness $e_2$ of between 5 and 50 nm;
- a high-index third layer (3), having a refractive index $n_3$ of between 1.8 and 2.3 and a geometrical thickness $e_3$ of at least 100 nm;
- a low-index fourth layer (4), having a refractive index $n_4$ of between 1.30 and 1.70 and a geometrical thickness $e_4$ of at least 80 nm.

This antireflection coating can be used in solar modules.

23 Claims, 5 Drawing Sheets

U.S. PATENT DOCUMENTS

| | | | |
|---|---|---|---|
| 5,532,871 | A | 7/1996 | Hashimoto et al. |
| 5,661,596 | A | 8/1997 | Biro et al. |
| 5,667,595 | A | 9/1997 | Vaverka et al. |
| 5,702,538 | A | 12/1997 | Endros et al. |
| 5,728,456 | A | 3/1998 | Adair et al. |
| 5,846,649 | A | 12/1998 | Knapp et al. |
| 5,856,018 | A | 1/1999 | Chen et al. |
| 5,891,556 | A | 4/1999 | Anderson et al. |
| 5,914,817 | A | 6/1999 | Browning et al. |
| 5,935,702 | A | 8/1999 | Macquart et al. |
| 5,952,084 | A | 9/1999 | Anderson et al. |
| 6,002,705 | A | 12/1999 | Thornton |
| 6,028,699 | A | 2/2000 | Fisher |
| 6,057,180 | A | 5/2000 | Sun et al. |
| 6,068,914 | A | 5/2000 | Boire et al. |
| 6,074,730 | A | 6/2000 | Laird et al. |
| 6,238,781 | B1 | 5/2001 | Anderson et al. |
| 6,256,437 | B1 | 7/2001 | Sakushima et al. |
| 6,278,809 | B1 | 8/2001 | Johnson et al. |
| 6,337,124 | B1 | 1/2002 | Anderson et al. |
| 6,387,515 | B1 | 5/2002 | Joret et al. |
| 6,495,203 | B2 | 12/2002 | Anderson et al. |
| 6,924,037 | B1 | 8/2005 | Joret et al. |
| 7,005,188 | B2 | 2/2006 | Anderson et al. |
| 7,153,595 | B2 | 12/2006 | Schicht et al. |
| 2001/0002295 | A1 | 5/2001 | Anderson et al. |

FOREIGN PATENT DOCUMENTS

| | | |
|---|---|---|
| EP | 0 791 562 | 8/1997 |
| WO | 97/43224 | 11/1997 |
| WO | 01/37006 | 5/2001 |

OTHER PUBLICATIONS

A.S. da Silva Sorinho, et al., "Transparent barrier coatings of polyethylene terephthalate by single and dual frequency plasma-enhanced chemical vapor deposition" (1998) J. Vac. Sci. Technol. A. 16(6), Nov./Dec. pp. 3190-3198.

Richard P. Vinci, et al. "Stress in copper thin films with barrier layers", Mat. Res. Soc. Symp. Proc., vol. 308 (1993), pp. 337-341.

J. Baixeras, et al., "Rapid thermal annealing of YBaCuO thin films sputtered on $SiO_2/Si_3N_4/Si$ substrates" Journal of the Less-Common Metals, 164 & 165 (1990), pp. 359-365.

L. Mouradoff, et al., Interaction between liquid aluminium and non-oxide ceramics (AlN, $Si_3N_4$, SiC), Key Engineering Materials, vol. 113 (1996), pp. 177-186.

TRANSPARENT SUBSTRATE COMPRISING AN ANTIREFLECTION COATING

The invention relates to a transparent, especially glass, substrate provided on at least one of its faces with an antireflection coating.

Antireflection coatings usually consist, in the simplest cases, of a thin interferential layer whose refractive index is between that of the substrate and that of air or, in the more complex cases, of a film comprising multiple thin layers (in general, an alternation of layers based on a dielectric having a high refractive index and a dielectric having a low refractive index).

In their more conventional applications, they are used to reduce the light reflection from substrates in order to increase their light transmission. Such substrates are, for example, the glazing intended for protecting paintings and for producing island displays, showcases or shop windows. They are therefore optimized by taking only into account the wavelengths in the visible range.

However, it turns out there may be a need to increase the transmission of transparent substrates for special applications, and not only in the visible range. These are, in particular, solar cells (also called solar modules or collectors), for example silicon cells. These cells need to absorb the maximum amount of solar energy that they receive, not only in the visible but also beyond it, most particularly in the near infrared. The "external" substrate (that turned towards the sky) of the cells is generally made of toughened glass.

It therefore seems to be advantageous, in order to increase their efficiency, to optimize the transmission of solar energy through this glass in the wavelengths important for solar cells.

A first solution has consisted in using extra-clear glass, having a very low content of iron oxide(s). Such is, for example, the glass sold by Saint-Gobain Vitrage in the "DIAMANT" range.

Another solution has consisted in providing the glass, on the outside, with an antireflection coating consisting of a monolayer of porous silicon oxide, the porosity of the material making it possible to lower the refractive index thereof. However, the performance of this monolayer coating is not very high. Furthermore, its durability, especially with regard to moisture, is insufficient.

The object of the invention is therefore to develop a novel antireflection coating which is capable of further increasing the transmission through the transparent substrate carrying it (and of further reducing the reflection therefrom), within a broad wavelength band, especially both in the visible and in the infrared.

Secondarily, the object of the invention is to develop a novel antireflection coating suitable for solar cells.

Secondarily, the object of the invention is to develop such coatings which are furthermore capable of undergoing heat treatments, especially if the carrier substrate is made of glass which, in its final application, must be annealed or toughened.

Secondarily, the object of the invention is to develop such coatings which are sufficiently durable for outdoor use.

The subject of the invention is primarily a transparent substrate, especially made of glass, having on at least one of its faces an antireflection coating (A) comprising multiple thin layers of a dielectric having alternately high and low refractive indexes. It comprises, in succession:

a high-index first layer 1, having a refractive index $n_1$ of between 1.8 and 2.3 and a geometrical thickness $e_1$ of between 5 and 50 nm;

a low-index second layer 2, having a refractive index $n_2$ of between 1.30 and 1.70 and a geometrical thickness $e_2$ of between 5 and 50 nm;

a high-index third layer 3, having a refractive index $n_3$ of between 1.80 and 2.30 and a geometrical thickness $e_3$ of at least 100 nm or at least 120 nm;

a low-index fourth layer 4, having a refractive index $n_4$ of between 1.30 and 1.70 and a geometrical thickness $e_4$ of at least 80 nm or at least 90 nm.

Within the context of the invention, the term "layer" is understood to mean either a single layer, or a superposition of layers in which each of the layers respects the refractive index indicated and in which the sum of their geometrical thicknesses also remains the value indicated for the layer in question.

Within the context of the invention, the layers are made of a dielectric, especially of the oxide or nitride type, as will be explained in detail below. However, it is not excluded for at least one of them to be modified so as to be at least slightly conductive, for example by doping a metal oxide, this being done, for example, so as possibly to also give the multilayer antireflection film an antistatic function.

The invention applies preferably to glass substrates, but it may also apply to transparent substrates based on a polymer, for example polycarbonate.

The invention therefore relates to an antireflection film of the four-layer type. This is a good compromise since the number of layers is large enough for their interferential interaction to allow a significant antireflection effect to be achieved. However, this number remains sufficiently reasonable for it to be possible to manufacture the product on a large scale, on an industrial line, on large substrates, for example using a vacuum deposition technique of the sputtering type (magnetically enhanced).

The thickness and refractive index criteria used in the invention make it possible to obtain a broadband antireflection effect with a substantial increase in the transmission of the carrier substrate, not only in the visible range but also beyond it, especially in the infrared and more particularly in the near infrared. This is high-performance antireflection over a wavelength range extending at least between 400 and 1100 nm.

Perhaps the three most noteworthy features of the invention are the following:

firstly, compared with a standard four-layer antireflection film (intended to antireflect a glass in the visible), the thickness of the low-index last layer has been increased: its preferred thickness is greater than the $\lambda/4$ value normally used (taking $\lambda$ as the centre of the visible spectrum);

secondly, the thickness of the high-index penultimate (third) layer is relatively large; and finally, it has been discovered that, unlike the choice of high-index layers usually made, it is not essential to choose materials having a very high index, such as $TiO_2$ or $Nb_2O_5$. It has turned that it was wiser on the contrary to use materials with a more moderate refractive index, especially of at most 2.3. This therefore goes counter to the known teaching with regard to multilayer antireflection films in general.

The inventors have thus discovered that they could use materials whose index is around 2, such as tin oxide $SnO_2$ or silicon nitride $Si_3N_4$ (which include within this formula, silicon nitrides which may contain other elements in a minor amount compared with silicon, such as a metal of the Al type, or boron, the indicated stoichiometry of the nitrogen with respect to the silicon therefore not being limiting, but merely for ease of writing. The same applies to the oxygen stoichiometry of the metal or silicon oxides mentioned in the present text). Especially compared with $TiO_2$, these materials have the advantage of having very much higher deposition rates when the deposition technique called sputtering is used. Within this moderate range of indices, there is also a greater choice of materials that can be deposited by sputtering. This provides more flexibility in industrial manufacture and a greater possibility of adjusting the properties of the multilayer film.

The inventors have thus selected thicknesses for the layers of the multilayer film which are different from the thicknesses usually chosen for conventional antireflection coatings intended to reduce reflection only in the visible. In the present invention, this selection has been made so as to antireflect the substrate not only in the visible but also in part of the infrared.

Given below are the preferred ranges of the geometrical thicknesses and of the indices of the four layers of the multilayer film according to the invention:

in the case of the first and/or the third layer, those having a high index:
  $n_1$ and/or $n_3$ are advantageously between 1.85 and 2.15, especially between 1.90 and 2.10 or between 2.0 and 2.1,
  $e_1$ is advantageously between 10 and 30 nm, especially between 15 and 25 nm,
  $e_3$ is advantageously between 100 and 180 nm, especially between 130 and 170 nm or between 140 and 160 nm;

in the case of the second and/or fourth layer, those having a low index:
  $n_2$ and/or $n_4$ are advantageously between 1.35 and 1.55 or alternatively between 1.40 and 1.50,
  $e_2$ is advantageously between 15 and 45 nm, especially between 20 and 40 nm, and is preferably less than or equal to 35 nm,
  $e_4$ is advantageously greater than or equal to 90 nm and is especially less than or equal to 120 or 110 nm, $e_4$ preferably being chosen between 95 and 115 nm.

According to a preferred variant of the invention, it is possible to replace the high-index first layer 1 and the low-index second layer 2 with a single layer 5 having a refractive index $e_5$ called "intermediate", especially one between 1.60 and 1.90, preferably between 1.70 and 1.80.

This layer preferably has a geometrical thickness $e_5$ of between 40 and 120 nm (preferably 60 to 100 nm or 65 to 85 nm).

In conventional three-layer antireflection films optimized for the visible range in perpendicular viewing, this thickness is instead generally chosen to be above 120 nm.

This intermediate-index layer has an optical effect similar to that of a high-index layer/low-index layer sequence when this is the first sequence, of the two layers closest to the carrier substrate of the multilayer film. It has the advantage of reducing the overall number of layers in the multilayer film. It is preferably based on a mixture between, on the one hand, silicon oxide and, on the other hand, at least one metal oxide chosen from tin oxide, zinc oxide and titanium oxide. It may also be based on silicon oxynitride or oxycarbide and/or based on aluminium oxynitride.

The most appropriate materials for constituting the first and/or the third layer, those having a high index, are based on one or more metal oxides chosen from zinc oxide ZnO, tin oxide $SnO_2$ and zirconium oxide $ZrO_2$. It may especially be a mixed Zn/Sn oxide, of the zinc stannate type. It may also be based on one or more nitrides chosen from silicon nitride $Si_3N_4$ and/or aluminium nitride AlN.

Using a nitride layer for one or other of the high-index layers, especially at least the third layer, makes it possible to add a functionality to the multilayer film, namely the ability to better withstand heat treatments without its optical properties being appreciably impaired. In point of fact, it is a functionality which is important in the case of any glass which has to form part of solar cells, since such glass must in general undergo a high-temperature heat treatment, of the toughening type, in which the glass must be heated between 500 and 700° C. It then becomes advantageous to be able to deposit the thin layers before the heat treatment without this causing any problem, since it is simpler from the industrial standpoint for the deposition to be carried out before any heat treatment. It is thus possible to have a single configuration of multilayer antireflection film, whether or not the carrier glass is intended to undergo a heat treatment.

Even if it is not intended to be heated, it is still beneficial to use at least one nitride layer, as this improves the mechanical and chemical durability of the multilayer film in its entirety. This is all the more important in applications to solar cells constantly exposed to the vagaries of the climate.

According to one particular embodiment, the first and/or the third layer, those having a high index, may in fact consist of several superposed high-index layers. This may most particularly be a bilayer of the $SnO_2/Si_3N_4$ or $Si_3N_4/SnO_2$ type. The advantage of this is the following: $Si_3N_4$ tends to be deposited a little less easily and slightly more slowly than a conventional metal oxide such as $SnO_2$, ZnO or $ZrO_2$ by reactive sputtering. Especially in the case of the third layer, which is the thickest and the most important for protecting the multilayer film from any deterioration resulting from a heat treatment, it may be beneficial to divide the layer in two, so as to put down just the thickness of $Si_3N_4$ sufficient to obtain the desired heat-treatment protection effect and to "top up" the layer optically with $SnO_2$, ZnO or a zinc-tin mixed oxide of the zinc stannate type.

The most appropriate materials for constituting the second and/or the fourth layer, those having a low index, are based on silicon oxide, silicon oxynitride and/or silicon oxycarbide or else based on a silicon-aluminium mixed oxide. Such a mixed oxide tends to have a better durability, especially chemical durability, than pure $SiO_2$ (an example of this is given in the Patent EP-791 562). The respective proportions of the two oxides may be adjusted in order to obtain the expected improvement in durability without excessively increasing the refractive index of the layer.

The glass chosen for the coated substrate of the multilayer film according to the invention, or for the other substrates with which it is associated in order to form glazing, may in particular be, for example, extra clear of the "Diamant" type (a glass with a low content of iron oxides in particular) or it may be a standard silica-soda-lime clear glass of the "Planilux" type (both types of glass are sold by Saint-Gobain Vitrage).

Two particularly beneficial examples of the coatings according to the invention comprise the following sequences of layers:

for a four-layer film:
  $SnO_2$ or $Si_3N_4/SiO_2/SnO_2$ or $Si_3N_4/SiO_2$ or SiAlO (SiAlO corresponds here to an aluminium-silicon mixed oxide, without prejudging their respective amounts in the material);

for a three-layer film:
  $SiON/Si_3N_4$ or $SnO_2/SiO_2$ or SiAlO (with the same convention for SiAlO, the formula SiON denoting here an oxynitride, again without prejudging the respective amounts of oxygen and nitrogen in the material).

Substrates of the glass type, especially extra-clear glass, having this type of multilayer film may thus achieve transmission values integrated between 400 and 1100 nm of at least 90%, especially for thicknesses of between 2 mm and 8 mm.

The subject of the invention is also the substrates coated according to the invention as the external substrates for solar cells of the Si or CIS type.

In general, this type of product is commercially available in the form of solar cells mounted in series and placed between two transparent rigid substrates of the glass type. The cells are held between the substrates by a polymer material (or several polymer materials). According to a preferred embodiment of the invention described in Patent EP 0739 042, the solar cells may be placed between the two substrates and then the hollow space between the substrates is filled with a cast polymer capable of curing, most particularly a polyurethane-based polymer coming from the reaction of an aliphatic isocyanate prepolymer and a polyether polyol. The polymer may be cured hot (at 30 to 50° C.) and possibly with a slight overpressure, for example in an autoclave. Other polymers may be used, such as ethylene-vinyl acetate EVA, and other arrangements are possible (for example, one or more sheets of thermoplastic polymer may be laminated between the two glass panels of the cells).

It is the combination of the substrates, polymer and solar cells that is called and sold as a "solar module".

The subject of the invention is therefore also the said modules. Using the modified substrate according to the invention, the efficiency of the solar modules can be increased by at least 1, 1.5 or 2% (expressed in terms of integrated current density) over modules which use the same substrate but do not have the coating. As it is known that solar modules are not sold to the square meter, but by the delivered electric power (approximately, it may be estimated that one square meter of solar cell can deliver about 130 watts), each additional percent of efficiency increases the electrical performance, and therefore the cost, of a solar module of given dimensions.

The subject of the invention is also the process for manufacturing glass substrates with an antireflection coating (A) according to the invention. One process consists in depositing all the layers, in succession, by a vacuum technique, especially by magnetically enhanced sputtering or by plasma-enhanced sputtering. Thus, it is possible to deposit the oxide layers by reactive sputtering of the metal in question in the presence of oxygen and the nitride layers in the presence of nitrogen. To do the $SiO_2$ or $Si_3N_4$, it is possible to start with a silicon target which is lightly doped with a metal, such as aluminium, in order to make it sufficiently conductive.

It is also possible, as recommended in the Patent WO 97/43224, for some of the layers of the multilayer film to be deposited by a hot deposition technique of the CVD type, the rest of the multilayer film being deposited cold by sputtering.

Figure 5:
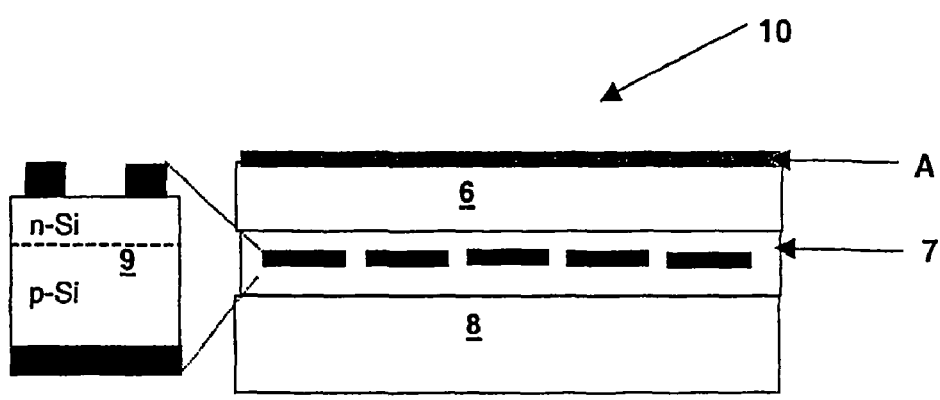

The details and advantageous features of the invention will now become apparent from the following non-limiting examples, with the aid of the figures:

FIG. 1: a substrate provided with a three-layer or four-layer antireflection film A according to the invention;

FIGS. 2, 3, 4, 6: graphs showing the transmission spectrum for the coated substrates according to the invention and the efficiency of the solar cells using them, compared with a reference cell;

FIG. 5: a solar module incorporating the substrate according to FIG. 1.

FIG. 1, which is highly schematic, shows, in cross section, a glass substrate 6 surmounted by an antireflection film (A) consisting of four layers 1, 2, 3, 4 or three layers 5, 3, 4.

EXAMPLE 1

This example uses a 4 mm thick substrate 6 made of extra-clear glass, from the aforementioned DIAMANT range. It uses the three-layer antireflection film.

The multilayer film was the following:

|  | Refractive index | Thickness (nm) |
|---|---|---|
| SiON (5) | 1.75 | 76 |
| $Si_3N_4$ (3) | 2.05 | 145 |
| $SiO_2$ (4) | 1.47 | 105 |

(The thicknesses indicated above are the geometrical thicknesses of the layers.)

The glass provided with the three layers was then toughened.

EXAMPLE 2

Example 2 relates to a four-layer antireflection film, and is the result of modelling.

In this example, the multilayer antireflection film used was the following:

|  | Refractive index | Thickness (nm) |
|---|---|---|
| $SnO_2$ (1) | 1.95-2.05 | 19 |
| $SiO_2$ (2) | 1.47 | 29 |
| $SnO_2$ (3) | 1.95-2.05 | 150 |
| $SiO_2$ (4) | 1.47 | 100 |

(The $SnO_2$ May be Replaced, in the Case of Layer (1) and/or layer (3), with $Si_3N_4$.)

EXAMPLE 2a

Example 2a was produced, this time experimentally, on a 4 mm extra-clear glass from the aforementioned DIAMANT range.

The coated glass of Examples 1, 2 and 2a (by calculation in the case of Example 2) were mounted as external glass panels of solar modules. FIG. 5 shows highly schematically a solar module 10 according to the invention. The module 10 was formed in the following manner: the glass panel 6 provided with the antireflection coating (A) was combined with a glass panel 8 called the "internal" glass panel. This glass panel 8 was made of toughened glass 4 mm in thickness and of the extra-clear ("Planidur DIAMANT") type. The solar cells 9 were placed between the two glass panels and then a polyurethane-based curable polymer 7 in accordance with the teaching of the aforementioned Patent EP 0 739 042 was poured into the inter-glass space.

Each solar cell 9 consisted, in a known manner, of silicon wafers forming a p-n junction and printed front and rear electrical contacts. The silicon solar cells could be replaced with solar cells using other semiconductors (such as CIS, CdTe, a-Si, GaAs, GaInP).

By way of comparison, a solar module identical to the previous one was mounted, but this time with an external glass panel 6 made of extra-clear glass without the antireflection coating according to the invention.

Figure 2:
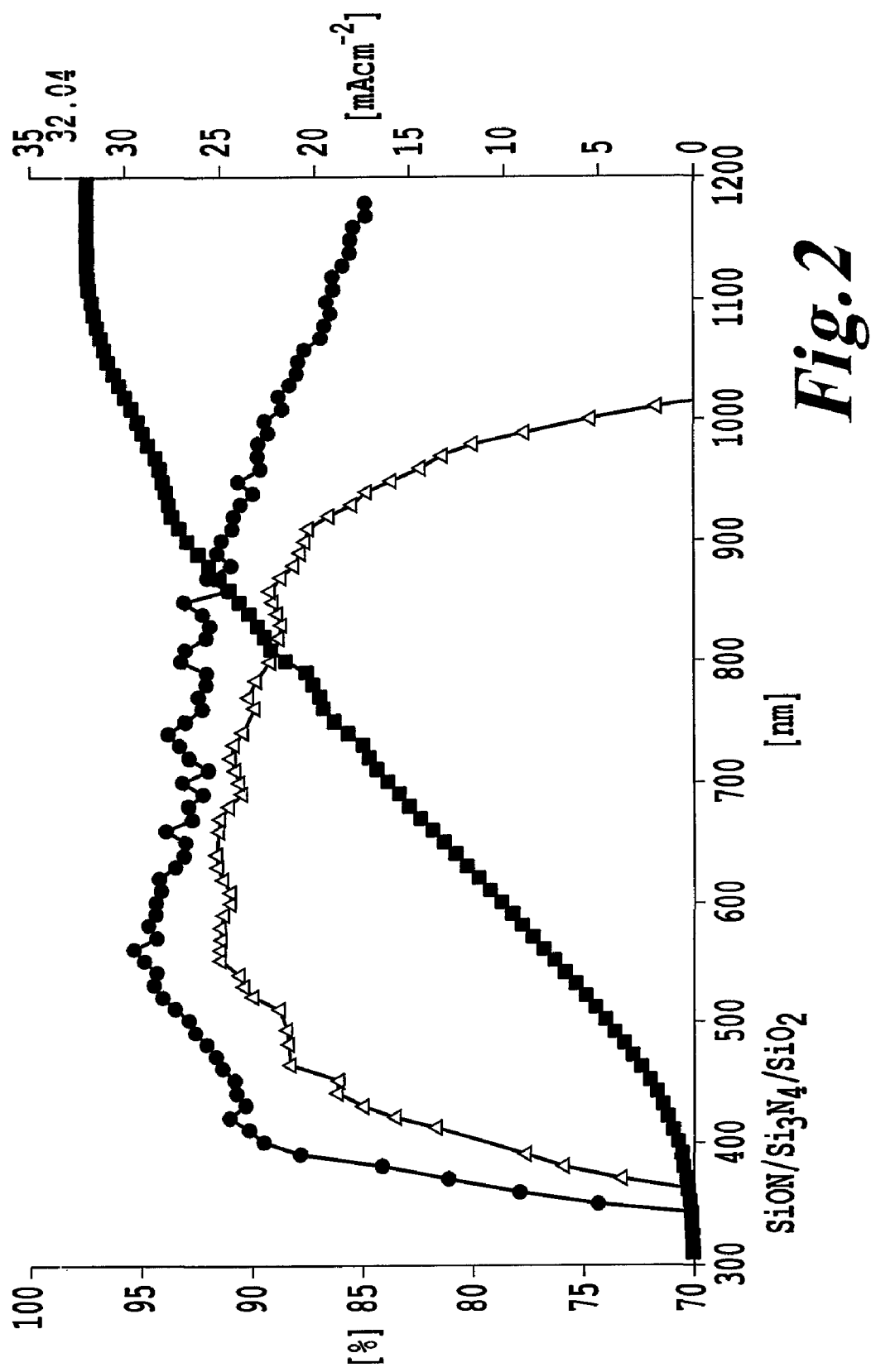

FIG. 2 shows the results of the cell using Example 1:
plotted on the x-axis are the wavelengths (λ) in nanometers;
plotted on the y-axis (on the right) is the integrated current density (d) generated by the cell in $mA/cm^2$;
plotted on the y-axis (on the left) is the transmission (T) as a percentage.
the curve with the triangles shows the degree of conversion of the solar energy into electrical energy (EQE, standing for External Quantum Efficiency) as a function of the wavelength;
the curve with circles represents the transmission T through the external glass panel 6 of the solar module;
the curve with squares represents the "Air Mass 1.5" integrated short-circuit current, taking into account the standard solar spectrum according to the ASTM E892-87 standard.

Figure 3:
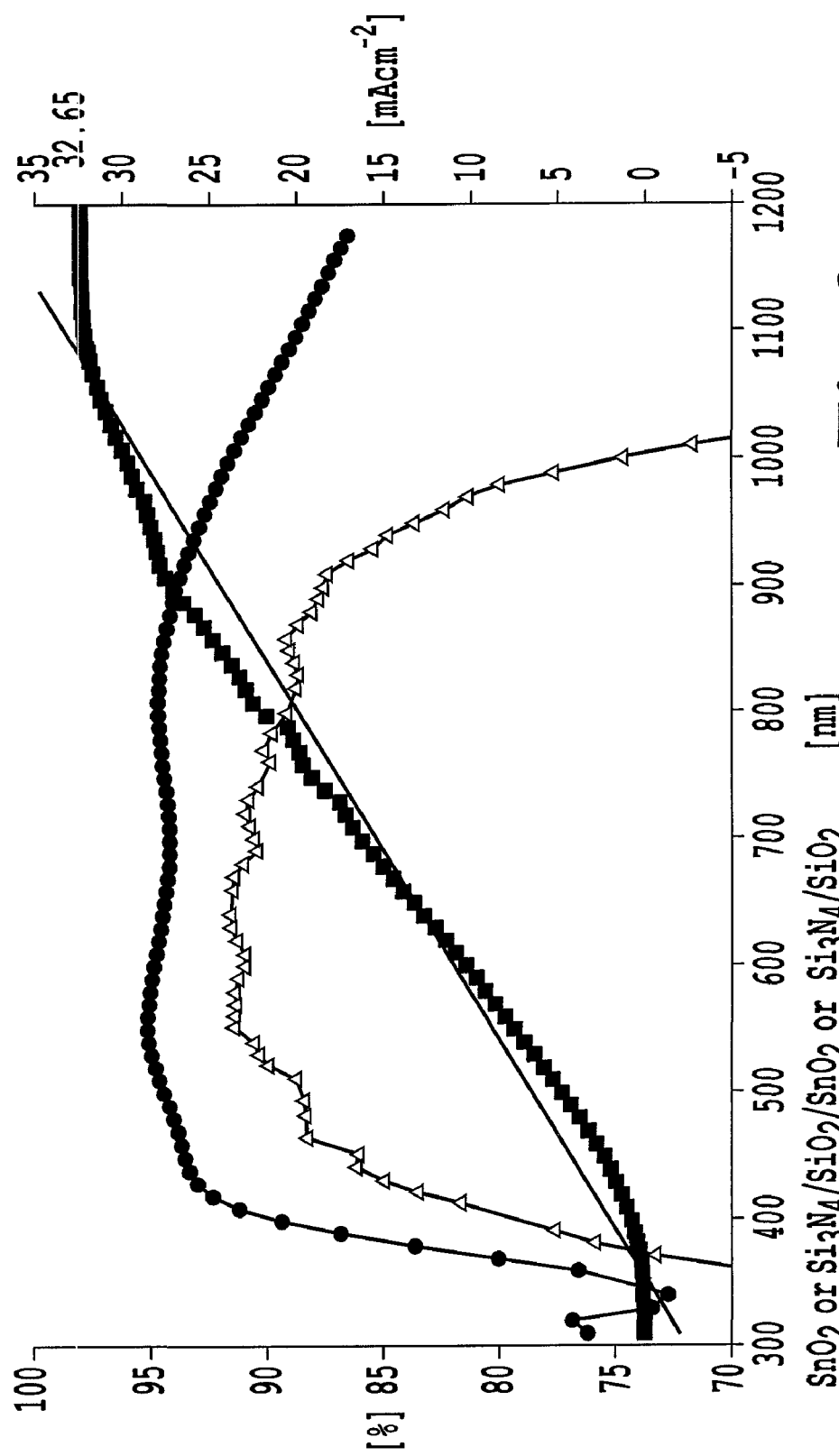

FIG. 3, with the same conventions, shows the modelling results obtained with the solar module using Example 2.

Figure 6:
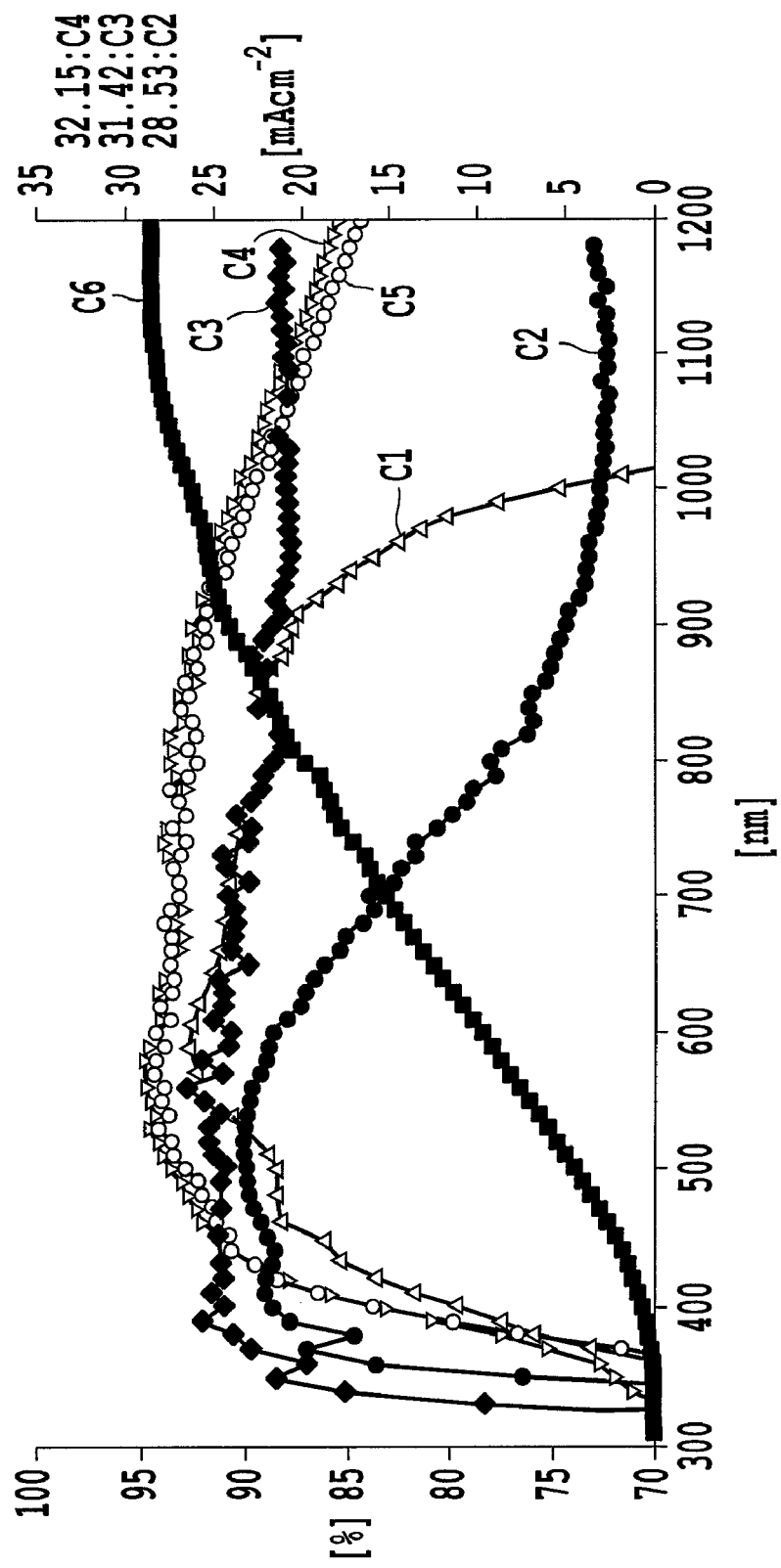

FIG. 6 shows the results obtained with the solar module using the coating actually produced according to Example 2a:
the curve with triangles C1 corresponds to the EQE explained above;
curve C2 corresponds to the transmission T through the external glass panel when it is made only of a standard silica-soda-lime glass 4 mm in thickness, from the Planilux range sold by Saint-Gobain Glass (for comparison);
curve C3 corresponds to the transmission T when the external glass panel is made of a glass 4 mm in thickness from the "DIAMANT" range (for comparison);
curve C4 corresponds to an external glass panel according to Example 2a, the glass once it had been provided with the antireflection coating having been subjected, before being mounted, to a toughening operation, followed by a moisture resistance test known as a damp-heat test, which consists in leaving the coated glass for 1000 hours at 85° C. in a chamber whose atmosphere has a controlled relative humidity of 85% (IEC 61215 standard);
curve C5 corresponds to an external glass panel again according to Example 2a, but this time the coated glass was subjected, prior to mounting, to a chemical resistance test known as a neutral salt-fog or NSF test, according to the EN ISO 6988 standard. This test consists in subjecting the glass to 20 cycles consisting of 8 hours at 40° C. and 100% relative humidity in an atmosphere containing 0.67% by volume of $SO_2$, followed by 16 hours at 23° C.±1° C. in an atmosphere having a relative humidity of 75%;
curve C6 (with squares) represents the integrated short-circuit current, with the same conventions as in FIG. 2.

Plotted on the y-axis are the three integrated current density values corresponding to curves C4, C3 and C2.

Figure 4:
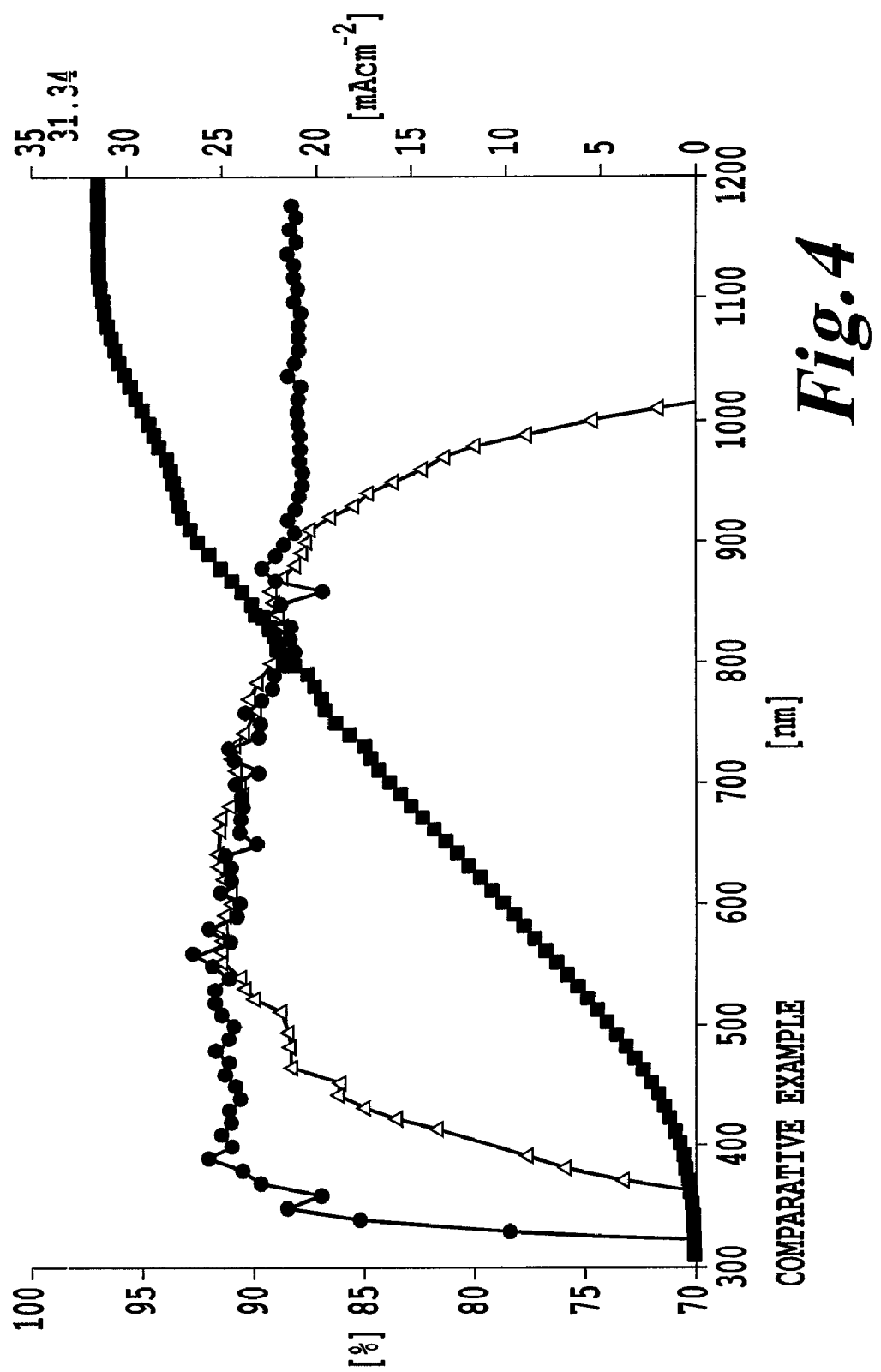

FIG. 4 shows, with the same conventions, the results obtained with the cell using the extra-clear glass without the antireflection coating, by way of comparison.

If the transmission curves of FIGS. 2 and 4 are compared, it may be seen that with the extra-clear glass without the multilayers (FIG. 4), the curve is flat in the 400 to 1100 nm range, at about 92%, unlike the transmission curve of Example 1 (FIG. 2).

These differences are manifested in the differences in the performance of the solar cells. The integrated current density goes from 31.34 $mA/cm^2$ in the case of the comparative example (FIG. 4) to 32.04 $mA/cm^2$ in the case of Example 1 and to 32.65 $mA/cm^2$ in the case of Example 2.

Since these solar cells use crystalline silicon, the efficiencies of conversion of solar energy into electrical energy, as a function of the wavelength are, however, similar in the case of the three cells.

These examples confirm that the antireflection coatings according to the invention allow the performance of the solar cells to be increased without excessively complicating their manufacture.

The results of Example 1 show that the antireflection coating (A) according to the invention is capable of undergoing heat treatments of the toughening type.

The experimental results of Example 2a confirm the modelling results of Example 2, with integrated current densities significantly higher than with glass without an antireflection coating. It has also been verified that these good results are obtained even when the coated glass has undergone a toughening treatment and/or water-resistance and chemical-resistance tests: the stability of the coating according to the invention is thus proved.

The four-layer coatings have a slightly higher performance than the three-layer coatings, but take a little longer to manufacture.

The present invention is an improvement of the invention described in Patent FR-2 800 998 which relates to antireflection coatings suitable for optimizing the antireflection effect at non-normal incidence in the visible (especially aimed at applications for vehicle windscreens). However, the coatings according to the present invention have thicknesses selected for a particular application to solar modules, especially with a thicker third layer (the thickness generally being at least 120 nm and not at most 120 nm).

The invention claimed is:

1. A transparent glass substrate comprising a material having a surface coated with an antireflective coating, wherein the antireflective coating can undergo heat treatment, and wherein the antireflective coating comprises:
   (i) a high-index first layer comprising zinc-tin mixed oxide, having a first refractive index, $n_1$, of between 1.8 and 2.3 and a first geometrical thickness, $e_1$, of between 5 and 50 nm;
   (ii) a low-index second layer comprising $SiO_2$, having a second refractive index, $n_2$, of between 1.30 and 1.70 and a second geometrical thickness, $e_2$, of between 5 and 50 nm;
   (iii) a high-index third layer comprising zinc-tin mixed oxide, having a third refractive index, $n_3$, of between 1.8 and 2.3 and a third geometrical thickness, $e_3$, of at least 120 nm;
   (iv) a low-index fourth layer comprising $SiO_2$, having a fourth refractive index, $n_4$, of between 1.30 and 1.70 and a fourth geometrical thickness, $e_4$, of at least 90 nm.

2. The transparent substrate of claim 1, wherein at least one of the first refractive index, $n_1$, or the third refractive index, $n_3$, is between 1.85 and 2.15.

3. The transparent substrate of claim 1, wherein at least one of the second refractive index, $n_2$, or the fourth refractive index, $n_4$, is between 1.35 and 1.55.

4. The transparent substrate of claim 1, wherein the first geometrical thickness, $e_1$, is between 10 and 30 nm.

5. The substrate of claim 1, wherein the second geometrical thickness, $e_2$, is between 15 and 45 nm.

6. The transparent substrate of claim 1, wherein at least one of the high-index first layer or the high-index third layer further comprises silicon nitride.

7. The transparent substrate of claim 1, wherein at least one of the high-index first layer or the high-index third layer comprises a superposition of layers.

8. The transparent substrate of claim 1, wherein at least one of the low index-second layer or the low-index fourth layer comprise silicon oxide, silicon oxynitride, silicon oxycarbide, or a mixed silicon-aluminum oxide.

9. The transparent substrate of claim 1, wherein the transmission integrated over a wavelength range of between 400 and 1100 nm is at least 90%.

10. A solar module comprising a plurality of Si or CIS solar cells and the transparent substrate of claim 1.

11. A solar module comprising a plurality of Si, CIS, CdTe, a-Si, GaAs or GaInP solar cells and the transparent substrate of claim 1.

12. The solar module of claim 11, having an efficiency, expressed in terms of integrated current density, that is increased by at least 1 percent relative to a solar module that does not include the transparent substrate.

13. The solar module of claim 12, wherein the solar cells are disposed between two glass substrates separated by an interspace and the interspace is filled with a curable polymer.

14. The solar module of claim 11, wherein the solar cells are disposed between two glass substrates separated by an interspace and the interspace is filled with a curable polymer.

15. The transparent substrate of claim 1, wherein the antireflective coating is deposited on the surface of the material by sputtering.

16. The transparent substrate of claim 1, wherein at least one of the first refractive index, $n_1$, or the third refractive index, $n_3$, is between 1.9 and 2.1.

17. The transparent substrate of claim 1, wherein the third geometrical thickness, $e_3$, is at least 130 nm and at least one of the first refractive index, $n_1$, or the third refractive index, $n_3$, is between 1.85 and 2.15.

18. The transparent substrate of claim 1, wherein the third geometrical thickness, $e_3$, is at least 140 nm and at least one of the first refractive index, $n_1$, or the third refractive index, $n_3$, is between 1.9 and 2.1.

19. The transparent substrate of claim 1, wherein the antireflective coating comprises:
   (i) the high-index first layer overlaying the substrate;
   (ii) the low-index second layer overlaying the high-index first layer;
   (iii) the high-index third layer overlaying the low-index second layer;
   (iv) the low-index fourth layer overlaying the high-index third layer.

20. The transparent substrate of claim 1, wherein the antireflective coating comprises:
   (i) the high-index first layer in contact with the substrate;
   (ii) the low-index second layer in contact with the high-index first layer;
   (iii) the high-index third layer in contact with low-index second layer;
   (iv) the low-index fourth layer in contact with high-index third layer.

21. A solar module comprising a plurality of Si, CIS, CdTe, a-Si. GaAs or GaInP solar cells and a transparent glass substrate comprising a material having a surface coated with an antireflective coating, wherein the antireflective coating can undergo heat treatment, and wherein the antireflective coating comprises:
   (i) a high-index first layer comprising zinc-tin mixed oxide, having a first refractive index, $n_1$, of between 1.8 and 2.3 and a first geometrical thickness, $e_1$, of between 5 and 50 nm;
   (ii) a low-index second layer comprising $SiO_2$, having a second refractive index, $n_2$, of between 1.30 and 1.70 and a second geometrical thickness, $e_2$, of between 5 and 50 nm;
   (iii) a high-index third layer comprising zinc-tin mixed oxide, having a third refractive index, $n_3$, of between 1.8 and 2.3 and a third geometrical thickness, $e_3$, of at least 120 nm;
   (iv) a low-index fourth layer comprising $SiO_2$, having a fourth refractive index, $n_4$, of between 1.30 and 1.70 and a fourth geometrical thickness, $e_4$, of at least 90 nm;
   wherein the antireflective coating can undergo heat treatment of from 400 to 600° C. and which permits transmission of near infrared radiation.

22. The transparent glass substrate of claim 1, wherein the zinc-tin mixed oxide in the high index first layer and the high index third layer is zinc stannate.

23. The transparent glass substrate of claim 21, wherein the zinc-tin mixed oxide in the high index first layer and the high index third layer is zinc stannate.

* * * * *